(12) United States Patent
Casucci et al.

(10) Patent No.: US 12,117,854 B2
(45) Date of Patent: Oct. 15, 2024

(54) PROBE ASSEMBLY FOR A COOKING APPLIANCE

(71) Applicant: WHIRLPOOL CORPORATION, Benton Harbor, MI (US)

(72) Inventors: Marco Casucci, Varese (IT); Simone Emanuele Ceron, Busto Arisizio (IT); Luca Corbo, Comabbio (IT); Alessandro Gigante, Varese (IT); Marta Maria Teresa Taverna, Milan (IT)

(73) Assignee: Whirlpool Corporation, Benton Harbor, MI (US)

( * ) Notice: Subject to any disclaimer, the term of this patent is extended or adjusted under 35 U.S.C. 154(b) by 443 days.

(21) Appl. No.: 17/498,478

(22) Filed: Oct. 11, 2021

(65) Prior Publication Data
US 2023/0111797 A1    Apr. 13, 2023

(51) Int. Cl.
| | | |
|---|---|---|
| *G05D 23/19* | (2006.01) | |
| *A47J 36/32* | (2006.01) | |
| *F24C 7/08* | (2006.01) | |
| *G01K 1/08* | (2021.01) | |
| *G01K 1/14* | (2021.01) | |
| *H05B 6/64* | (2006.01) | |

(52) U.S. Cl.
CPC .......... *G05D 23/1928* (2013.01); *A47J 36/32* (2013.01); *F24C 7/085* (2013.01); *G01K 1/08* (2013.01); *G01K 1/14* (2013.01); *H05B 6/6452* (2013.01); *A47J 2202/00* (2013.01)

(58) Field of Classification Search
CPC ... G01K 1/14; G01K 1/08; F24C 7/085; A47J 36/32; G05D 23/1928
USPC .......... 126/273 R; 374/149, 1.005; 454/184
See application file for complete search history.

(56) References Cited

U.S. PATENT DOCUMENTS

| | | |
|---|---|---|
| 2,906,124 A | 9/1959 | Chaney |
| 3,815,113 A * | 6/1974 | Welch ............... G01K 3/005 |
| | | 327/449 |
| 5,938,959 A | 8/1999 | Wang |
| (Continued) | | |

FOREIGN PATENT DOCUMENTS

| | | |
|---|---|---|
| CN | 208075457 U | 11/2018 |
| CN | 211372947 U | 8/2020 |
| (Continued) | | |

OTHER PUBLICATIONS

Tenergy, "Solis Bluetooth Digital Food Thermometer with Six Probes," accessed via The Home Depot website on Oct. 11, 2021, at https://www.homedepot.com/p/Tenergy-Solis-Bluetooth-Digital-Food-Thermometer-with-Six-Probes-59132/305945684.

*Primary Examiner* — Vivek K Shirsat
(74) *Attorney, Agent, or Firm* — Price Heneveld LLP (57) ABSTRACT

A probe assembly for a cooking appliance includes an outer case that includes a cap, a body, and retention features that are coupled to each of the cap and the body. A first temperature sensor is operably coupled to the cap of the outer case. A probe is operably coupled to the body of the outer case and is selectively concealed by the cap. A second temperature sensor is operably coupled to the probe. A controller is communicatively coupled to each of the first temperature sensor and the second temperature sensor. The controller is configured to receive a first signal from the first temperature sensor when the cap is directly coupled to the body of the outer case.

20 Claims, 9 Drawing Sheets

(56) References Cited

U.S. PATENT DOCUMENTS

| | | |
|---|---|---|
| 6,734,403 B2 | 5/2004 | Baker et al. |
| 7,128,466 B2 * | 10/2006 | Chang ...................... F24C 7/08 |
| | | 374/149 |
| 7,223,944 B2 | 5/2007 | Kitabayashi et al. |
| 7,381,933 B2 | 6/2008 | Cristiani |
| 9,879,864 B2 | 6/2018 | Gutierrez et al. |
| 10,599,168 B2 | 3/2020 | Raghaven et al. |
| 10,641,498 B2 | 5/2020 | Blum et al. |
| 2010/0224752 A1 | 9/2010 | Best et al. |
| 2013/0061765 A1 * | 3/2013 | Reinhart ............... F24C 15/001 |
| | | 236/49.5 |
| 2018/0120167 A1 | 5/2018 | Hammer et al. |
| 2022/0381624 A1 * | 12/2022 | Young ...................... G01K 3/14 |

FOREIGN PATENT DOCUMENTS

| | | |
|---|---|---|
| DE | 202005017251 U1 | 3/2007 |
| DE | 102004044100 B4 | 3/2009 |
| DE | 102010062504 B4 | 4/2013 |
| DE | 102016102260 A1 | 8/2017 |
| DE | 102007011565 B4 | 2/2018 |
| DE | 102017110067 A1 | 11/2018 |
| EP | 1867926 A2 | 12/2007 |
| EP | 2431667 A1 | 3/2012 |

* cited by examiner

FIG. 10

PROBE ASSEMBLY FOR A COOKING APPLIANCE

BACKGROUND OF THE DISCLOSURE

The present disclosure generally relates to a cooking appliance, and more specifically, to a probe assembly for a cooking appliance.

SUMMARY OF THE DISCLOSURE

According to one aspect of the present disclosure, a cooking appliance includes a housing that defines a cooking cavity. A rack is disposed within the cooking cavity. A probe assembly includes retention features that selectively couple the probe assembly to the rack. The probe assembly further incudes an outer case that includes a cap that is operably coupled with and selectively removable from a body of the outer case. The outer case also includes a first temperature sensor. A probe is disposed within the outer case and includes a second temperature sensor.

According to another aspect of the present disclosure, a probe assembly for a cooking appliance includes an outer case that includes a cap, a body, and retention features that are coupled to each of the cap and the body. A first temperature sensor is operably coupled to the cap of the outer case. A probe is operably coupled to the body of the outer case and is selectively concealed by the cap. A second temperature sensor is operably coupled to the probe. A controller is communicatively coupled to each of the first temperature sensor and the second temperature sensor. The controller is configured to receive a first signal from the first temperature sensor when the cap is directly coupled to the body of the outer case.

According to yet another aspect of the present disclosure, a cooking appliance includes a housing that includes a user interface and defines a cooking cavity. A probe assembly is disposed within the cooking cavity. The probe assembly includes a body that includes a probe and a first retention feature. A cap includes a second retention feature and is removably coupled to the body. The cap includes a first temperature sensor and the probe of the body includes a second temperature sensor. A control unit is communicatively coupled to the first temperature sensor of the cap. A controller is communicatively coupled to the user interface and the control unit of the probe assembly and is configured to display temperature data on the user interface.

These and other features, advantages, and objects of the present disclosure will be further understood and appreciated by those skilled in the art by reference to the following specification, claims, and appended drawings.

The components in the figures are not necessarily to scale, emphasis instead being placed upon illustrating the principles described herein.

DETAILED DESCRIPTION

The present illustrated embodiments reside primarily in combinations of method steps and apparatus components related to a probe assembly for a cooking appliance. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

Figure 1:
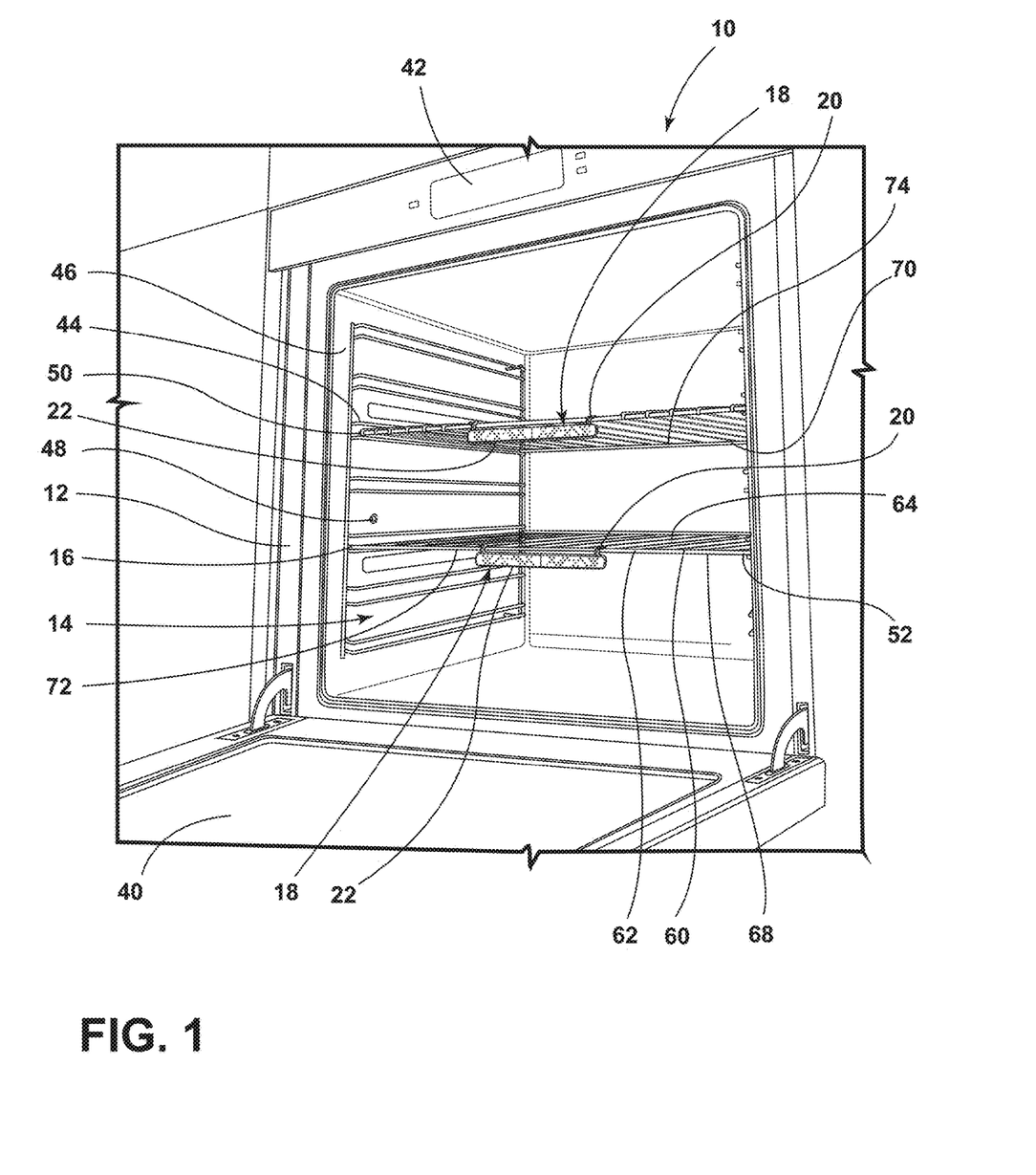
FIG. 1 is a partial enlarged front perspective view of a cooking appliance of the present disclosure.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-10, reference numeral 10 generally designates a cooking appliance that includes a housing 12 defining a cooking cavity 14. A rack 16 is disposed within the cooking cavity 14, and a probe assembly 18 includes retention features 20 that selectively couple the probe assembly 18 to the rack 16. The probe assembly 18 also includes an outer case 22 that includes a cap 24 operably coupled with and selectively removable from a body 26 of the outer case 22. The outer case 22 also includes a first temperature sensor 28. A probe 30 is disposed within the outer case 22 and includes a second temperature sensor 32.

Figure 2:
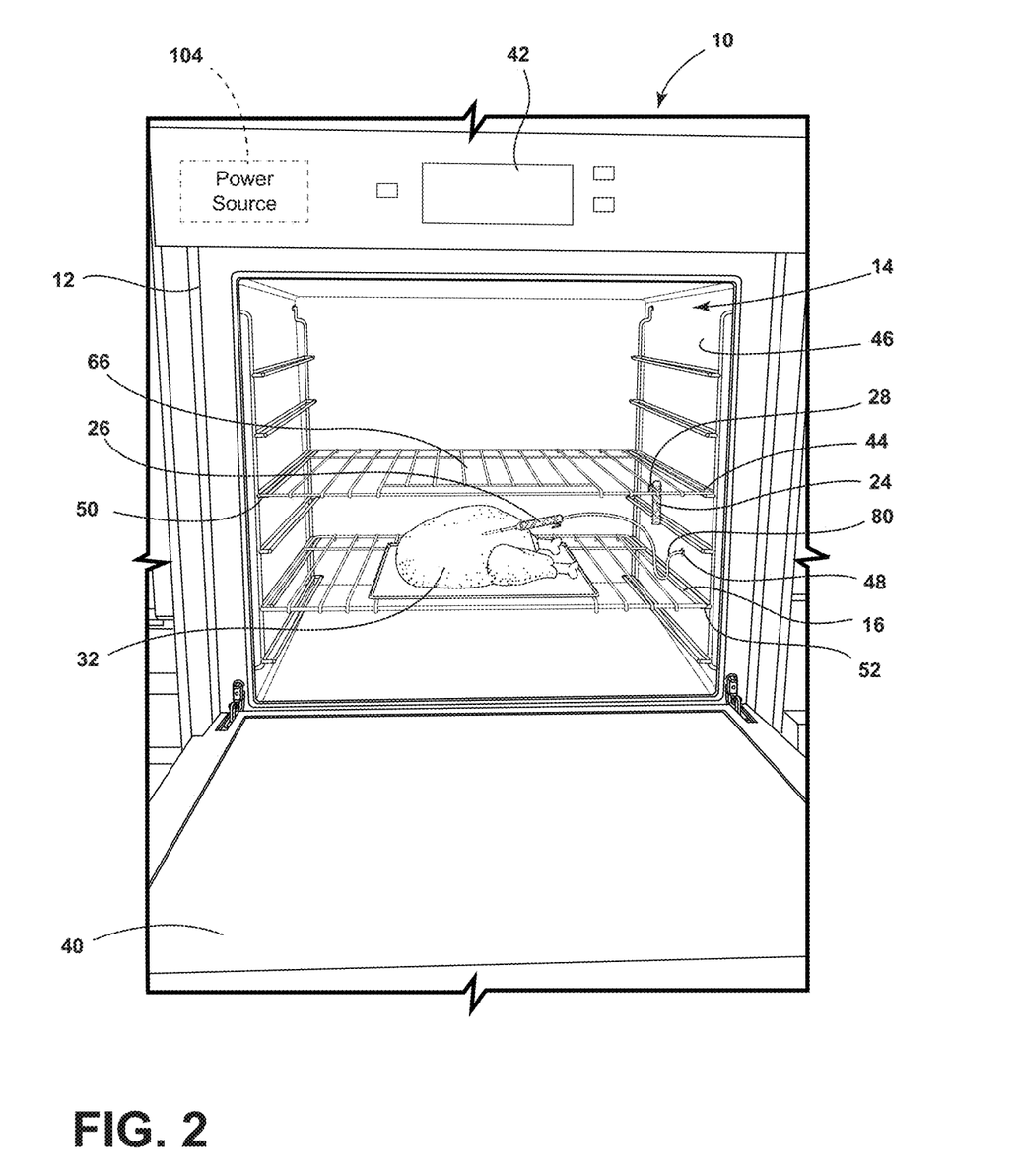
FIG. 2 is a partial enlarged front perspective view of a cooking appliance of the present disclosure with a food item on a rack and a probe assembly of the present disclosure.
Figure 3:
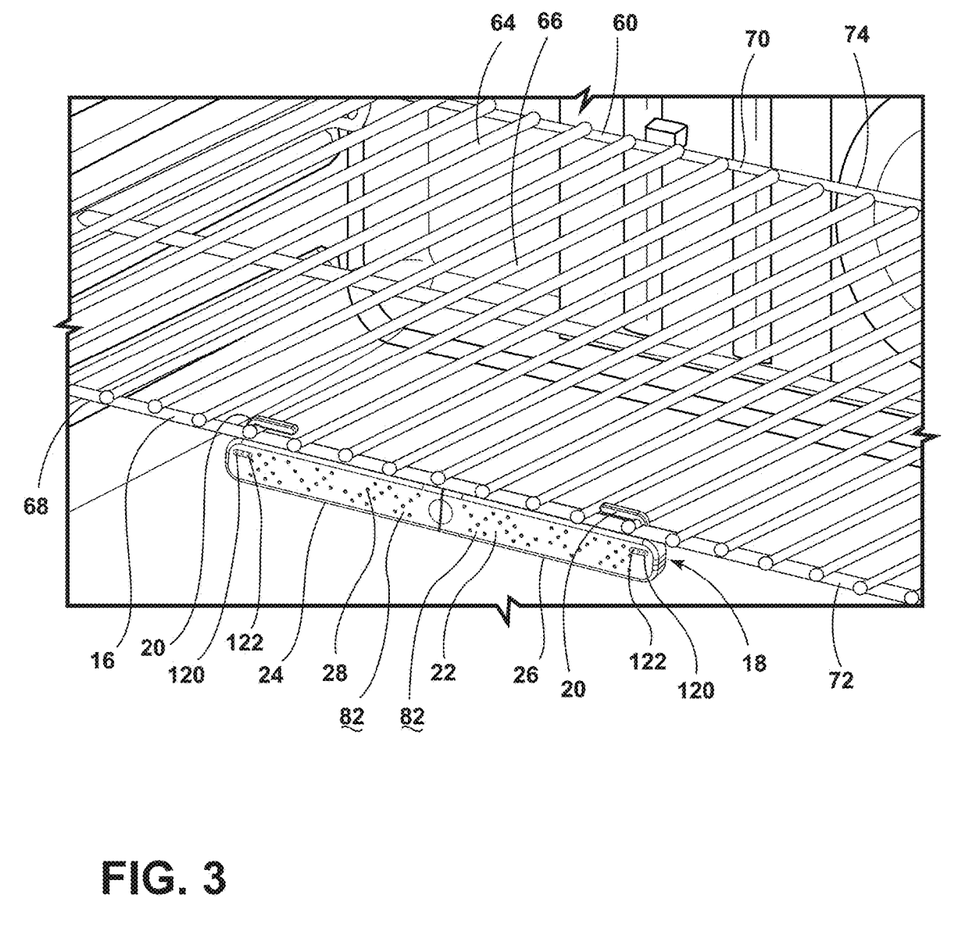
FIG. 3 is a partial enlarged top perspective view of a probe assembly of the present disclosure coupled to a rack of a cooking appliance.
Figure 4:
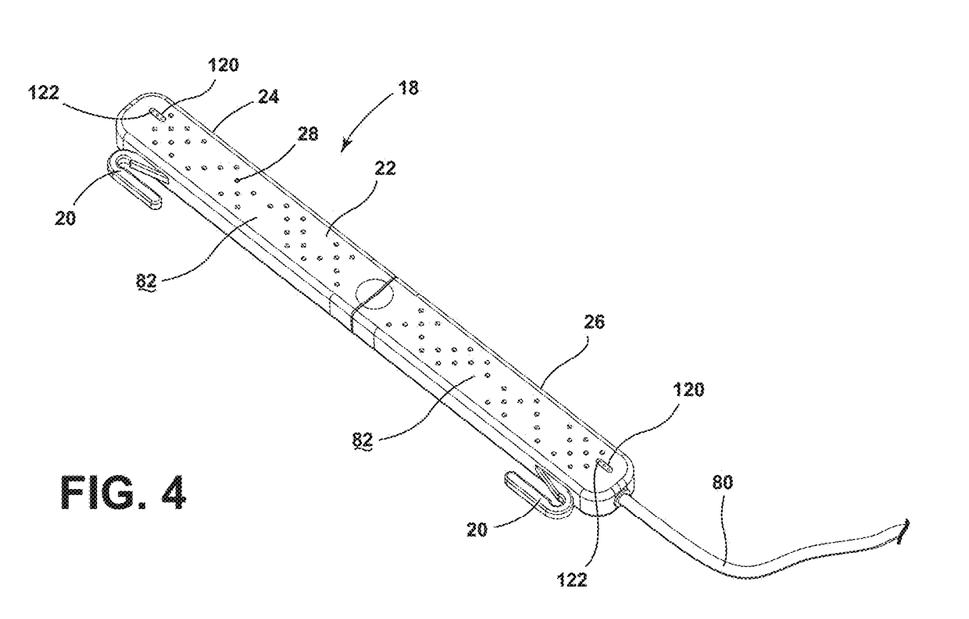
FIG. 4 is a side perspective view of a probe assembly of the present disclosure with a cap coupled to a body of the probe assembly.
Figure 5:
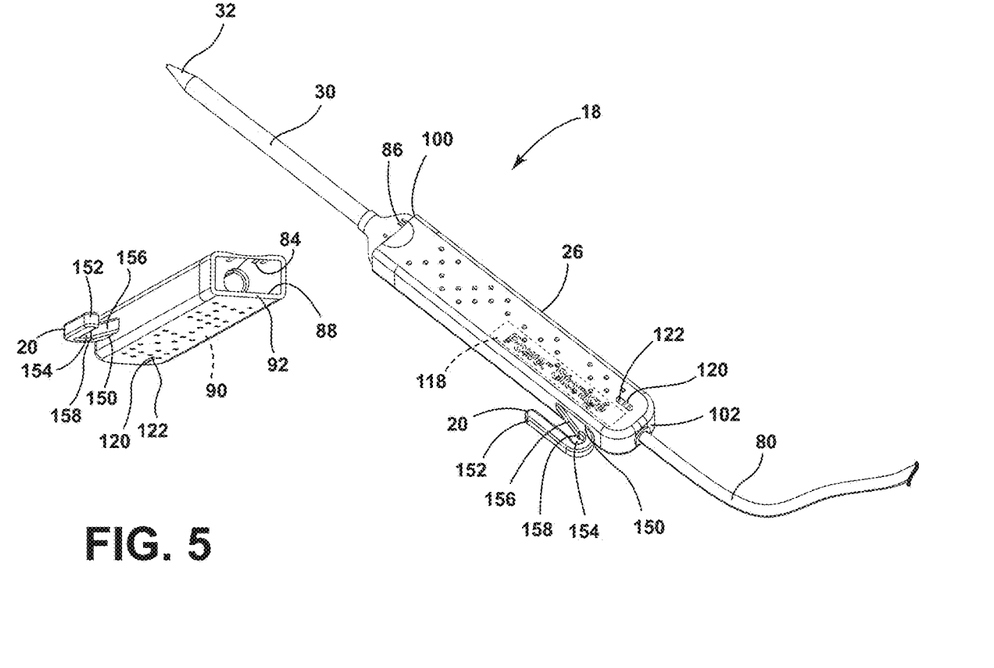
FIG. 5 is a side perspective view of the probe assembly of FIG. 4 with the cap removed and a probe extending from the body.
Figure 6:
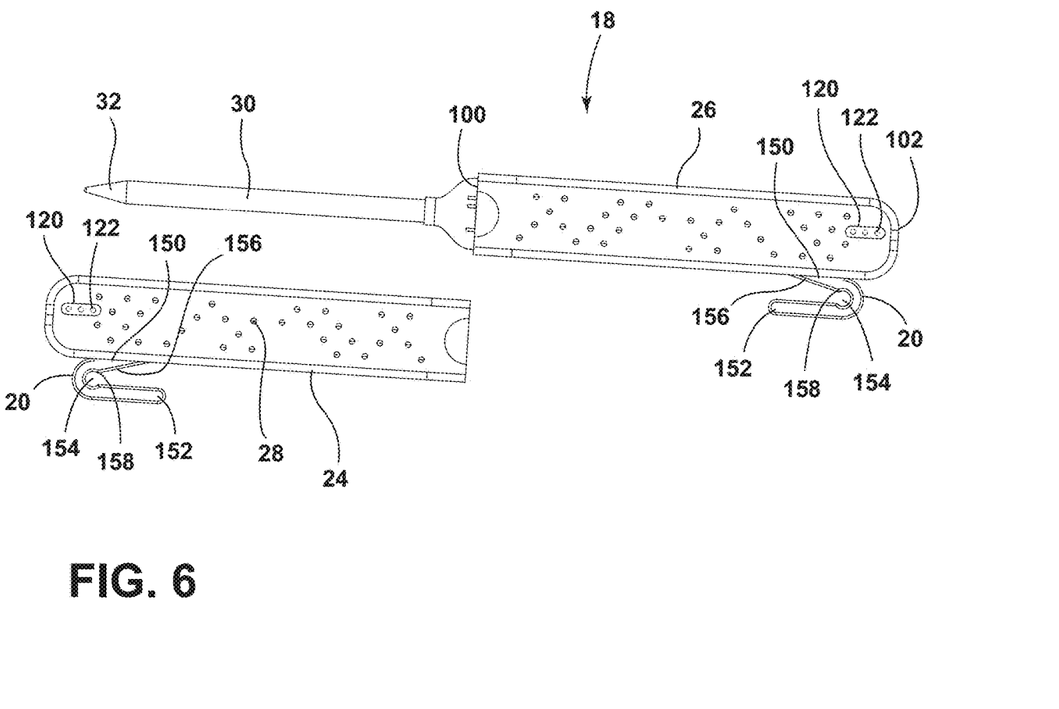
FIG. 6 is a side plan view of a probe assembly of the present disclosure with retention features coupled to and outer case of the probe assembly.
Figure 7:
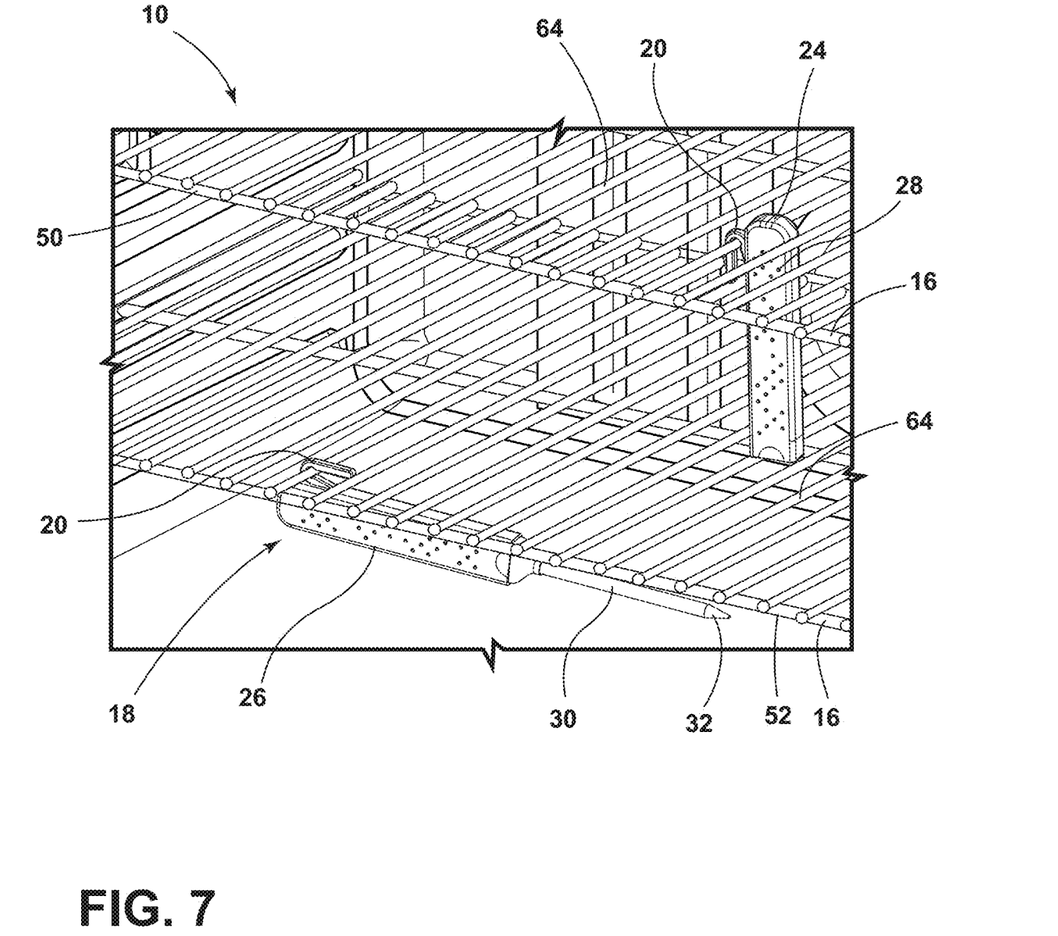
FIG. 7 is a partial enlarged side perspective view of a probe assembly of the present disclosure with a cap of the probe assembly coupled to a first rack of a cooking appliance and a body of the probe assembly coupled to a second rack of the cooing appliance.

Referring to FIGS. 1-3, the probe assembly 18 is illustrated within the cooking appliance 10, which is illustrated as a built-in oven. It is also contemplated that the probe assembly 18 may be used in other cooking appliances such as microwaves, toaster ovens, ranges, and other similar cooking appliances. As illustrated in FIG. 1, the cooking appliance 10 includes a door 40 that is operably coupled to the housing 12 and a user interface 42 operably coupled to the housing 12 proximate to the door 40. The housing 12 includes supports 44 defined along sidewalls 46 of the housing 12 within the cooking cavity 14. The sidewalls 46 can also define a connector port 48 that is electrically coupled with the user interface 42, as described further below. It is also contemplated that multiple connector ports 48 may be defined along the sidewalls 46 in various locations. Typically, the connector ports 48 may be defined proximate to the supports 44 so as to be proximate to the rack 16. It is contemplated that the rack 16 may be positioned upon the supports 44 to retain the rack 16 within the cooking cavity 14. The cooking appliance 10 may include multiple racks 16 including at least a first rack 50 and a second rack 52. As described herein, the features of the rack 16 are contemplated to be present in any number of racks 16 that may be utilized with the cooking appliance 10.

A perimeter rim 60 of the rack 16 generally defines a frame 62 of the rack 16, and spaced rails 64 are disposed within a central portion 66 of the rack 16. The spaced rails 64 extend between a first end 68 and a second end 70 of the perimeter rim 60, such that the spaced rails 64 are coupled to the first and second ends 68, 70 of the frame 62. Each rail of the plurality of spaced rails 64 may extend around the first and second ends 68, 70 of the perimeter rim 60. Additionally or alternatively, each rail 64 may be operably coupled to the first and second ends 68, 70, such that the rails 64 may abut the first and second ends 68, 70 within the central portion 66 of the rack 16. The rails 64 may be operably coupled to the perimeter rim 60 via spot welding, casting, and/or other coupling methods generally known in the art. It is generally contemplated that the first end 68 of the perimeter rim 60 corresponds to a forward crossbar 72 of the rack 16 and the second end 70 corresponds to a rearward crossbar 74 of the rack 16.

Referring still to FIGS. 1-3, the probe assembly 18 can be operably coupled to the forward crossbar 72 of the rack 16 via the retention features 20. As mentioned above, the probe assembly 18 includes the outer case 22, the probe 30, and a control unit 76, in addition to the retention features 20. The control unit 76 can be disposed within the cap 24 of the outer case 22 and is communicatively coupled with each of the first temperature sensor 28 and the second temperature sensor 32. It is generally contemplated that the control unit 76 may include a first control unit 76a and a second control unit 76b, which may be disposed within the cap 24 and the body 26, respectively. Each of the first and second control units 76a, 76b may be communicatively coupled to transfer temperature data from each of the first and second temperature sensors 28, 32, respectively. The probe assembly 18 may also optionally include a cable 80 to communicatively and/or electrically couple the probe assembly 18 with the cooking appliance 10, described below. It is generally contemplated that the retention features 20 are operably coupled to the outer case 22 and are configured to couple the probe assembly 18 to the rack 16. For example, the retention features 20 may clip or otherwise be disposed around at least one of the rails 64 to couple the probe assembly 18 to the rack 16 at the outer case 22. It is further contemplated that a first retention feature 20a may be coupled to the cap 24, and a second retention feature 20b may be coupled to the body 26 of the outer case 22.

The outer case 22 includes the cap 24 and the body 26 and each of the cap 24 and the body 26 has an outer surface 82. It is generally contemplated that the first temperature sensor 28 may be integrally formed with the outer surface 82 of at least the cap 24. Additionally or alternatively, the first temperature sensor 28 may be integrally formed with the outer surface 82 of each of the body 26 and the cap 24. Stated differently, the first temperature sensor 28 may be embedded or otherwise formed as a unitary body with the outer surface 82 of the cap 24, such that the first temperature sensor 28 may be defined as a single, monolithic, and/or unitary body with the cap 24.

Referring now to FIGS. 2-7, the cap 24 is operably and removably coupled to the body 26. The removable coupling of the cap 24 with the body 26 can define a snap-fit configuration to provide tactile feedback to the user when the cap 24 is coupled to the body 26. Additionally or alternatively, the cap 24 may be coupled to the body 26 via magnetic connectors. In either configuration, it is generally contemplated that the body 26 is electrically and communicatively coupled with the control unit 76 when the cap 24 is coupled to the body 26, as described below. The cap 24 may include electrical connectors 84, and the body 26 may include pins 86 that are selectively and operably coupled with the electrical connectors 84 of the cap 24. The electrical connection between the cap 24 and the body 26 via the electrical connectors 84 and the pins 86 is described in more detail below with respect to the control unit 76.

The cap 24 defines an opening 88 and a cavity 90 in which the probe 30 may be selectively disposed. It is generally contemplated that the electrical connectors 84 may be positioned along a perimeter edge 92 that defines the opening 88, such that the electrical connectors 84 can couple with the pins 86 of the body 26 as the cap 24 is disposed over the probe 30. The operable coupling and operation of the cap 24 is described in more detail below with respect to the first temperature sensor 28 and the control unit 76.

Referring still to FIGS. 2-7, the body 26 of the outer case 22 has a first end 100 and a second end 102 and includes the pins 86 are disposed along the first end 100 of the body 26 proximate to the probe 30. The pins 86 are communicatively coupled with the control unit 76 and are configured to communicatively couple the body 26 with the control unit 76 via the electrical connectors 84. The pins 86 may also be configured to transfer electrical power to the cap 24. The pins 86 are formed from a conductive material, such as metal, to electrically couple the cap 24 to the control unit 76 and a power source 104 of the probe assembly 18. The pins 86 are configured to provide a bridge or other electrical connection to transfer electrical currents received from the power source 104 to the cap 24 via the electrical connectors 84.

Referring to FIGS. 2 and 5-8, while the control unit 76 may be disposed within the cap 24, it is also contemplated that the control lunit 34 may be disposed within the body 26. For example, it is generally contemplated that the body 26 may be generally hollow, such that the control unit 76 may be disposed within the body 26. The body 26 may also house electrical components 106 associated with the probe 30. The probe 30 may be operably coupled with the control unit 76 via the electrical components 106 within the body 26, as described in more detail below. The control unit 76 of the probe assembly 18 includes a memory storage 108 that can be configured with routines 110. The control unit 76 may also be configured with a processor 112 and other control circuitry. The processor 112 is configured to execute the routines 110 stored in the memory storage 108 based on the data and/or communications received by the control unit 76.

The other control circuitry of the control unit 76 may include communication circuitry 114 for bidirectional communication. For example, the control unit 76 may be communicatively coupled with a wireless communication interface 116, described below, via the communication circuitry 114. While the memory storage 108 can be included within the control unit 76, cloud storage, or other remotely accessible memory interfaces can also be used instead of or in combination with the memory storage 108. The control unit 76 may be onboard the probe assembly 18. Additionally or alternatively, the control unit 76 may be separately disposed within the cooking appliance 10 and communicatively coupled with the probe assembly 18.

The wireless communication interface 116 may be implemented via one or more direct or indirect nonhierarchical communication protocols, including but not limited to, Bluetooth®, Bluetooth® low energy (BLE), Thread, Ultra-Wideband, Z-wave, ZigBee, etc. Additionally, the communication interface 116 may correspond to a centralized or hierarchal communication interface 116 where one or more of the devices communicate via the wireless router (e.g., a communication routing controller). Accordingly, the communication interface 116 may be implemented by a variety of communication protocols, including, but not limited to, global system for mobile communication (GSM), general packet radio services, code division multiple access, enhanced data GSM environment, fourth-generation (4G) wireless, fifth-generation (5G) wireless, Wi-Fi, world interoperability for wired microwave access (WiMAX), local area network, Ethernet, etc. By flexibly implementing the communication interface 116, the various devices and servers may be in communication with one another directly via the wireless communication interface 116 or a cellular data connection.

Each of the controller and the control unit(s) disclosed herein may include various types of control circuitry, digital or analog, and may each include a processor, a microcontroller, an application specific integrated circuit (ASIC), or other circuitry configured to perform the various inputs or outputs, control, analysis, or other functions described herein. The memories described herein may be implemented in a variety of volatile and nonvolatile memory formats. Routines may include operating instructions to enable the various methods described herein.

With further reference to FIGS. 2 and 5-8, the cable 80 can be operably coupled to the second end 102 of the body 26, such that the probe 30 and the cable 80 can be diametrically opposed. Additionally or alternatively, the cable 80 may extend from the body 26 at any practicable location. As described in more detail below, the cable 80 is configured to operably couple with the connector port 48 defined by at least one of the sidewalls 46 of the cooking appliance 10. It is generally contemplated that the cable 80 may be configured to couple the probe assembly 18 with the power source 104. The power source 104 may be disposed within the cooking appliance 10. The cable 80 can transfer power to the probe assembly 18 via the connector port 48. The cable 80 may also be utilized to transfer temperature data from the probe assembly 18 to the cooking appliance 10, as described in more detail below. For example, the controller 132 of the cooking appliance 10 may be communicatively coupled to the control unit 76 of the probe assembly 18 via the cable 80.

It is also contemplated that the probe assembly 18 may be charged externally from the cooking appliance 10 via the cable 80 being operably coupled to an external power source 104. The cable 80 may be configured to electrically couple with the external power source 104 via an adaptor to charge the probe assembly 18. It is further contemplated that the probe assembly 18 can be configured with wireless charging capabilities such that the probe assembly 18 can be wirelessly coupled to a wireless charger. It is generally contemplated that the probe assembly 18 may be configured with an internal power storage 118 that is operably coupled with the control unit 76. The internal power storage 118 may store enough power to operate the probe assembly 18 for a predetermined amount of time without a direct communication to the power source 104. It is contemplated that the power storage 118 may be disposed within the body 26 and/or the cap 24.

Referring again to FIGS. 2 and 5-8, the probe assembly 18 can also include a power indicator 120 disposed on the outer case 22. The power indicator 120 may include light emitting diodes (LEDs) 122 configured to indicate a charge of the probe assembly 18. The control unit 76 may utilize the power indicator 120 to reflect the power stored within the internal power storage 118 of the probe assembly 18. The user can advantageously view the available power of the probe assembly 18 to determine whether additional power may need to be supplied to the probe assembly 18 prior to use. The power indicator 120 can be communicatively coupled with the control unit 76, such that the control unit 76 is configured to activate and deactivate the LEDs 122 to indicate the charge of the probe assembly 18.

It is also contemplated that the power indicator 120 may be utilized to reflect when the probe assembly 18 is operably coupled to the power source 104. By way of example, not limitation, the LEDs 122 may be illuminated via the control unit 76 when the cable 80 is disposed within the connector port 48 of the cooking appliance 10 coupling the probe assembly 18 to the power source 104. The illumination of the LEDs 122 can indicate that the probe assembly 18 is receiving electrical power from the power source 104. Additionally or alternatively, the LEDs 122 may reflect the current charge status of the probe assembly 18, such that illumination of all of the LEDs 122 may correspond to the probe assembly 18 being fully charged.

With further reference to FIGS. 2 and 5-8, the power indicator 120 may be positioned on both the body 26 and the cap 24 of the probe assembly 18. The cap 24 may operate independently of the body 26, such that the cap 24 may have a separate charge as compared to the body 26. The LEDs 122 on the cap 24 may reflect to the user the current charge of the cap 24 to determine when to couple to the body 26 to charge or otherwise reestablish the electrical connection. The cap 24 may be charged via the connection between the electrical connectors 84 and the pins 86 via electrical transfer from the power source 104. As described further herein, it is generally contemplated that the power source 104 may be part of a control system 130 of the cooking appliance 10.

Figure 8:
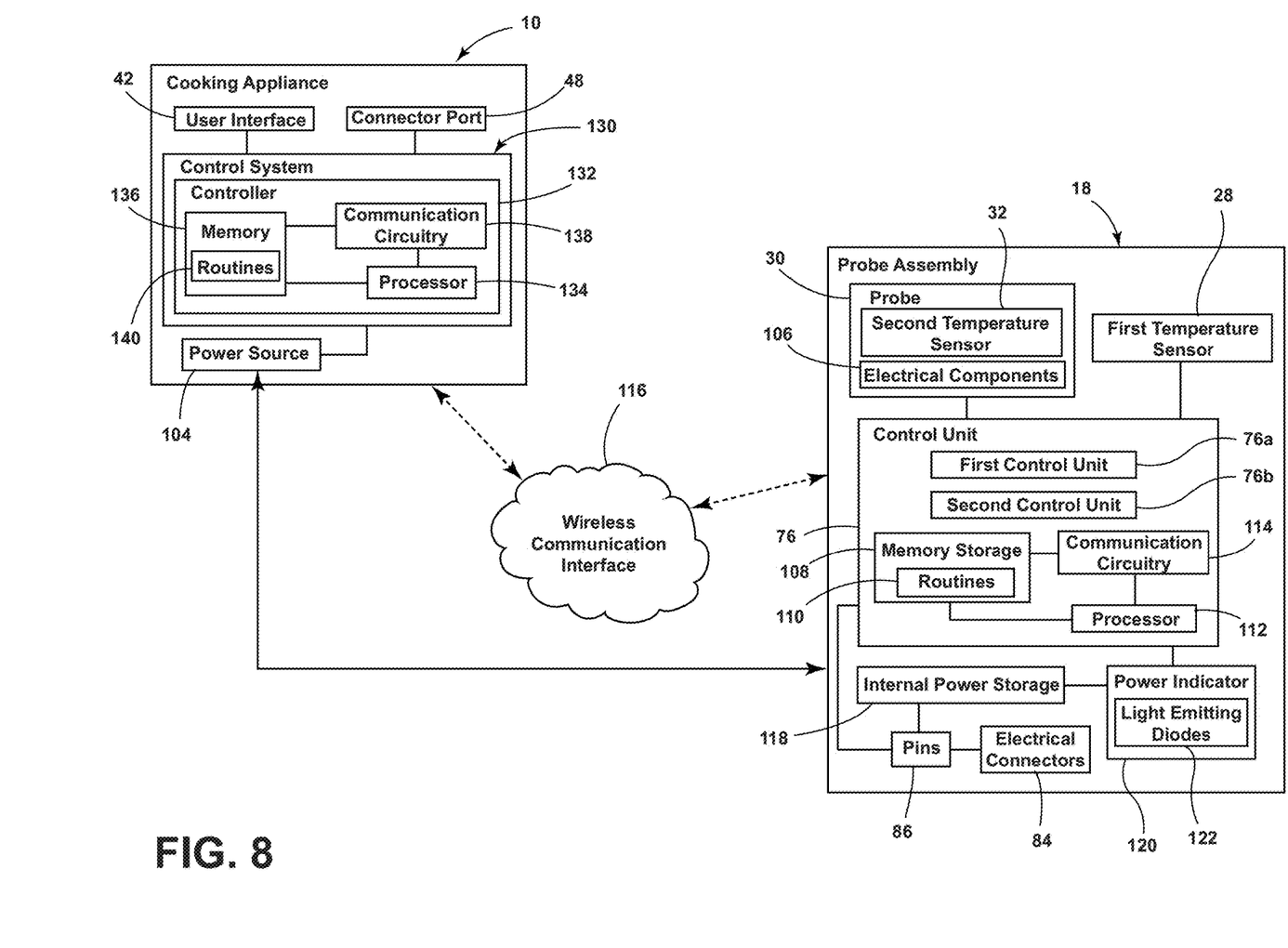
FIG. 8 is a schematic block diagram of a control system of a cooking appliance and a probe assembly of the present disclosure.

The control system 130 of the cooking appliance 10 can include a controller 132 that may be communicatively coupled with the control unit 76 of the probe assembly 18. The controller 132 includes a processor 134, a memory 136, and communication circuitry 138. Instructions or routines 140 are stored within the memory 136 and are executable by the processor 134. The control system 130 of the cooking appliance 10 may also include the user interface 42, which is communicatively coupled with the controller 132. The user may operate and otherwise control the countertop appliance 10 and/or the probe assembly 18 via the user interface 42 and the controller 132, as described in more detail below. For example, the user interface 42 may indicate when the probe assembly 18 is receiving power from the power source 104. The user interface 42 may also display the temperature data received by the controller 132 via the probe assembly 18 and/or may display the power level of the probe assembly 18.

With reference now to FIGS. 7-10 and in operation, it is generally contemplated that in one configuration the control unit 76 may provide power to the first temperature sensor 28 via direct coupling of the cap 24 with the body 26. For example, the electrical connectors 84 of the cap 24 may engage with the pins 86 to transfer power to the first temperature sensor 28. As mentioned above, the first temperature sensor 28 is integrally formed with the cap 24, and the first temperature sensor 28 is operable when the cap 24 is coupled to the body 26. In this configuration, it is generally contemplated that the cap 24 and the first temperature sensor 28 are generally free from electrical current when the electrical connectors 84 of the cap 24 are disconnected or otherwise uncoupled from the pins 86 of the body 26. The first temperature sensor 28 may be inoperable, in this configuration, when the cap 24 is free from direct connection with the body 26. Stated differently, the first temperature sensor 28 is electrically powered when the electrical connectors 84 are operably engaged with the pins 86, such that the cap 24 is coupled to the body 26. It is further contemplated that the electrical connectors 84 remain inactive when the cap 24 is uncoupled from the body 26.

In an alternate configuration and as mentioned above, the cap 24 may also include the internal power storage 118, such that the first temperature sensor 28 may be operable when the cap 24 is uncoupled or otherwise detached from the body 26. Stated differently, the first temperature sensor 28 is operable when the cap 24 is free from direct connection with the body 26. In this alternate configuration, the cap 24 may be coupled to the body 26 to charge the internal power storage 118 when the probe assembly 18 is operably coupled to the power source 104 wirelessly and/or via the cable 80. The cap 24 may then be removed from the body 26 and positioned elsewhere within the cooking cavity 14. Stated differently, the internal power storage 118 of the cap 24 can independently power the first temperature sensor 28 when the cap 24 is spaced apart from the body 26. It is also contemplated that the power indicator 120 may be disposed on the cap 24 to indicate the power level of the internal power storage 118, as mentioned above.

With further reference to FIGS. 7-10 and in operation, the first temperature sensor 28 is configured as an air probe. The first temperature sensor 28 may be referred to as an air temperature sensor and is configured to detect the temperature of the air within the cooking cavity 14. The cap 24 may be positioned within the cooking cavity 14 in any practicable location to detect the air temperature of the cooking cavity 14. For example, the cap 24 may be independently operable from the body 26, as mentioned above, such that the cap 24 and the body 26 can be coupled to separate racks 16. For example, the cap 24 can be coupled to the first rack 50, and the body 26 can be coupled to the second rack 52. The cap 24 and the body 26 are each coupled to the first and second racks 50, 52, respectively, via the retention features 20. The retention features 20 are illustrated as clips and/or hooks that are configured to be disposed over the spaced rails 64 of the racks 16. The retention features 20 may also be configured as circular clips, snaps, clasps, and/or other practicable retention features 20 that may be utilized to couple the cap 24 and the body 26 to the racks 16.

The retention features 20 advantageously assist the user in maximizing the utility of the probe assembly 18, such that the user may utilize both the first temperature sensor 28 and the second temperature sensor 32 simultaneously. For example, the user may remove the cap 24 from the body 26 and couple the cap 24 to the first rack 50 via the retention feature 20. Each retention feature 20 can include an attachment portion 150 coupled to the outer surface 82 of the outer case 22 and a retention portion 152 extending from the attachment portion 150 to define a notch 154 therebetween. The attachment portion 150 may also include an angled edge 156 that further defines the notch 154. The notch 154 is configured to receive at least one of the rails 64 of the racks 16 to retain the probe assembly 18 on the racks 16. It is generally contemplated that the angled edge 156 of the attachment portion 150 may also include a projection 158 configured to narrow the retention feature 20 proximate to the notch 154 to define a snap-fit configuration between the retention feature 20 and the racks 16. The snap-fit configuration between the retention features 20 and the rack 16 is such that the cap 24 may be adjusted or otherwise engaged by the user while remaining attached and/or coupled to the racks 16. For example, the user may bump or otherwise engage the cap 24 during adjustment or positioning of a food item within the cooking cavity 14, and the cap 24 may rotate or otherwise be adjusted while remaining coupled to the rack 16 via the retention feature 20.

It is generally contemplated that the cap 24 may be coupled to the rack 16 via the retention feature 20 in either a vertical and/or horizontal configuration. The cap 24 may be coupled to the perimeter rim 60 of the racks 16 in the vertical orientation. The cap 24 may be coupled to the central portion 66 of the rack(s) 16 to advantageously provide a centralized detection of the air within the cooking cavity 14. By way of example, not limitation, the cap 24 is in the horizontal orientation when coupled to the central portion 66 of the rack 16. In either the horizontal or the vertical configuration, the retention features 20 advantageously retain the cap 24 and/or the body 26 with the rack 16 to both provide a temperature reading of the cooking cavity 14 and generally store the probe assembly 18 within the cooking appliance 10.

With further reference to FIGS. 1-10, the body 26 is also coupled to the rack 16 via the retention features 20. As mentioned above, the body 26 includes the probe 30 that has the second temperature sensor 32, and the second temperature sensor 32 is operable when the cap is removed from the body. It is generally contemplated that the probe 30 is configured to detect a temperature of a food item within the cooking cavity 14 via the second temperature sensor 32. The probe 30 may be utilized by the user by removing the cap 24 from the body 26 to expose the probe 30 and inserting the probe 30 into the food item disposed within the cooking cavity 14. The second temperature sensor 32 is configured to detect the temperature of the food item and communicate the detected temperature via a signal communicated with the control unit 76. For purposes of description, the first temperature sensor 28 may be described as sending a first temperature signal to the control unit 76, and the second temperature sensor 32 may be described as sending a second temperature signal to the control unit 76. For example, the control unit 76 is configured to receive the first temperature signal from the first temperature sensor 28 and the second temperature signal from the second temperature sensor 32 via the wireless communication interface 116.

The first signal received by the control unit 76 generally corresponds to the air temperature of the cooking cavity 14, and the second signal received by the control unit 76 generally corresponds to the temperature of the food item within the cooking cavity 14. The first and second signals may be collectively referred to as temperature data. The control unit 76 may communicate the temperature data with the controller 132 to compare the first and second signals with a predetermined temperature of each of the cooking cavity 14 and the food item. For example, the user may set a preset cooking temperature of the cooking cavity 14 via the user interface 42, and the first temperature sensor 28 may detect the air temperature of the cooking cavity 14 throughout a cooking cycle. The detected air temperature is communicated with the control unit 76 to advantageously monitor the temperature within the cooking cavity 14 throughout the cooking cycle. The control unit 76 may communicate with the detected air temperature with the controller 132 to compare the selected cooking temperature with the detected air temperature from the first temperature sensor 28. Additionally or alternatively, the detected air temperature may be communicated with the controller 132 via the cable 80.

Referring still to FIGS. 1-10 and in operation, the controller 132 may adjust the temperature of the cooking appliance 10 based on the detected temperature of the cooking cavity 14 via the first temperature sensor 28. Stated differently, the controller 132 is configured to adjust the temperature of the cooking appliance 10 in response to the temperature data received from the control unit 76 and/or the cable 80 of the probe assembly 18. For example, the cooking cavity 14 may be pre-heated to the preset cooking temperature, and the first temperature sensor 28 may detect an air temperature of the cooking cavity 14 that is different from the preset cooking temperature. The controller 132 receives the first signal from the control unit 76 and/or the cable 80 corresponding to the detected air temperature and may adjust the temperature of the cooking appliance 10 in response.

Figure 9:
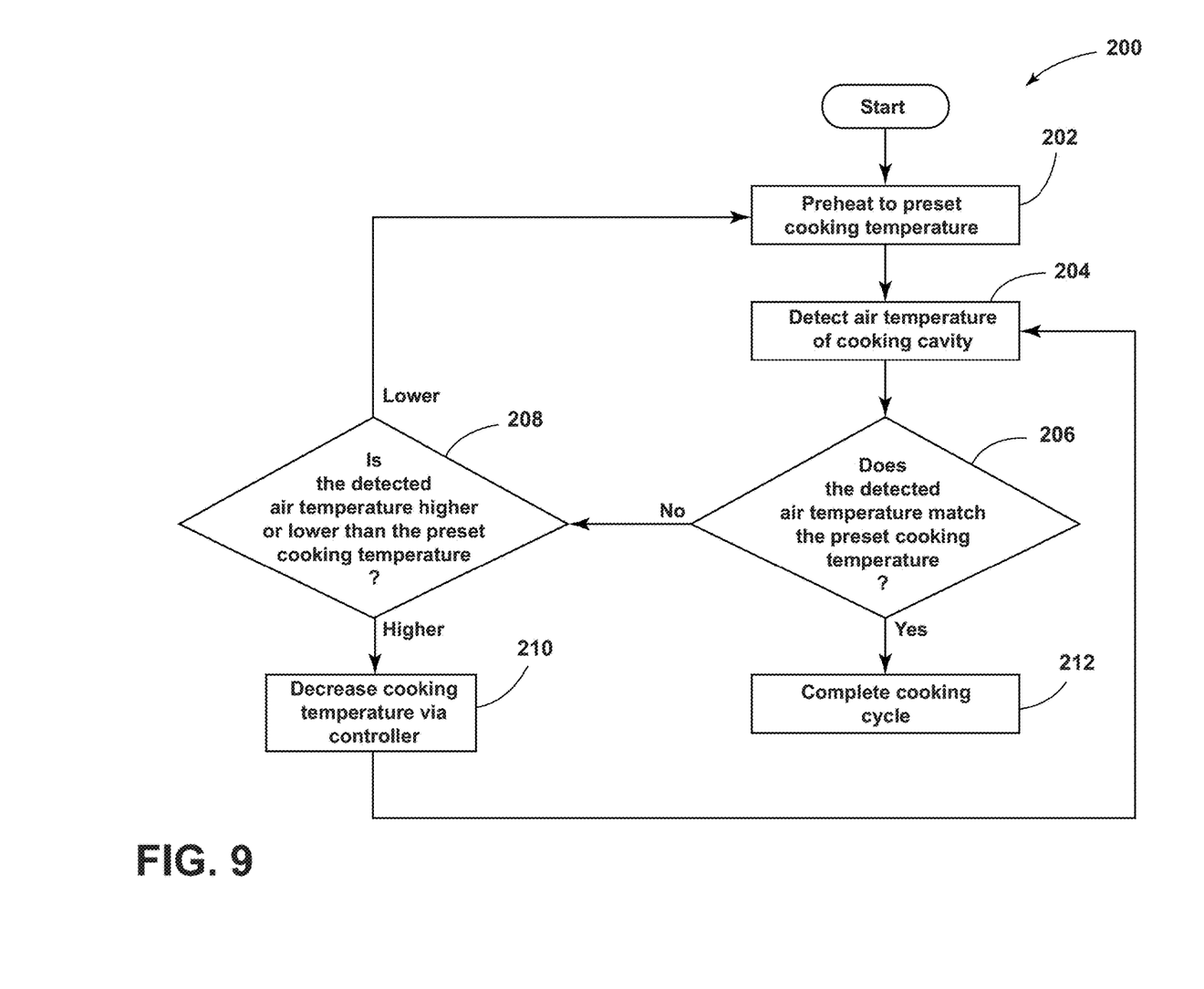
FIG. 9 is a flow diagram for a method of detecting an air temperature of a cooking appliance.

For example, a method 200 of detecting an air temperature includes preheating the cooking cavity 14 to the preset cooking temperature (step 202). The cap 24 can detect the air temperature of the cooking cavity 14 and communicate the detected air temperature with the controller 132 via the control unit 76 (step 204). The controller 132 can compare the detected air temperature with the preset cooking temperature to determine whether the detected air temperature matches the preset cooking temperature (decision step 206). If the detected air temperature does not match the preset cooking temperature, then the controller 132 determines whether the temperature is higher or lower than the preset temperature (decision step 208). If the detected air temperature is higher than the preset temperature, then the controller 132 can decrease the temperature of the cooking cavity (step 210). If the detected air temperature is lower than the preset temperature, then the controller 132 can continue the preheating process and return to step 202. The controller 132 can complete the cooking cycle once the detected air temperature matches the preset cooking temperature (step 212).

Figure 10:
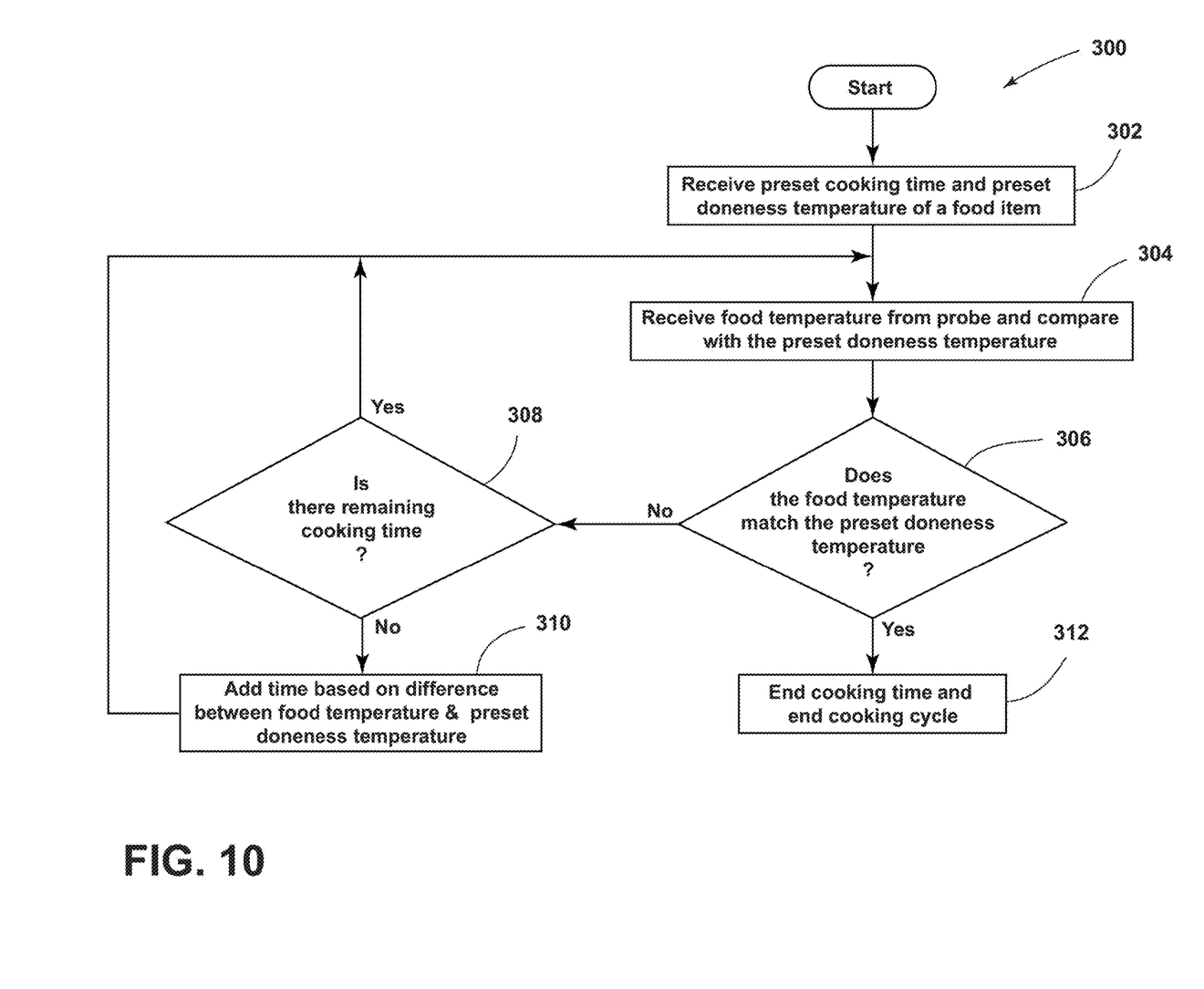
FIG. 10 is a flow diagram for a method of detecting a food temperature via a probe assembly of the present disclosure.

The user may also input a preset doneness temperature that corresponds to a temperature at which the food item is considered to be fully cooked. The user may place the probe 30 within the food item at the beginning of a cooking cycle, and the second temperature sensor 32 may intermittently send the second signal to the control unit 76 corresponding to the current temperature of the food item. The control unit 76 may communicate the detected food temperature with the controller 132, and the controller 132 may compare the detected food temperature with the preset temperature for the food item to determine the doneness of the food item. It is also contemplated that the user may set a cooking time that the user may anticipate coinciding with the preset doneness temperature. The controller 132 may compare the detected food temperature with the preset doneness temperature and may adjust the cooking time set by the user based on the detected food temperature.

For example, the user may set a cooking time of 20-minutes and a preset temperature of 165° F. The second temperature sensor 32 may detect a temperature of the food item of 155° F. at a cooking time of 18-minutes, such that the controller 132 may adjust the cooking time by a calculated amount until the temperature detected by the second temperature sensor 32 corresponds to the preset doneness temperature. Additionally or alternatively, the user may set a cooking time of 20-minutes and a preset temperature of 165° F., and the second temperature sensor 32 may detect a food temperature corresponding to 165° F. at a cooking time of 18-minutes. In this alternate scenario, the controller 132 may stop the cooking cycle in response to the detected predetermined doneness temperature detected by the second temperature sensor 32.

By way of example, not limitation, and as outlined in FIG. 10, a method 300 of detecting a food temperature includes the controller 132 receiving a preset cooking time and a preset doneness temperature of a food item (step 302). The controller 132 can then receive a food temperature from a probe 30 via the control unit 76 (step 304). The controller 132 can compare the received food temperature with the preset doneness temperature to determine whether the detected food temperature matches the preset doneness temperature (decision step 306). If the detected food temperature is lower than the preset doneness temperature, then the controller 132 can determine whether there is remaining cooking time from the preset cooking time (decision step 308). If there is no remaining time, then the controller 132 can determine how much time to add to the cooking cycle based on the difference between the detected food temperature and the preset doneness temperature (step 310). Steps 304-310 are repeated until the detected food temperature matches or exceeds the preset doneness temperature and the controller 132 can end the cooking time and end the cooking cycle (step 312).

With further reference to FIGS. 1-10, the user may advantageously monitor the temperature of the cooking cavity 14 and the food item via the probe assembly 18. The probe assembly 18 can be conveniently coupled to the rack 16 via the retention features 20 during operation of the cooking cycle and/or for storage of the probe assembly 18. The retention features 20 may snap-fit with the rack 16 at any desirable location. The cap 24 may be operably independent of the body 26, such that the retention feature 20 of the cap 24 may separately couple the cap 24 to the rack 16.

For example, the cap 24 can be coupled to the first rack 50 while the body 26 and the probe 30 can be coupled to the second rack 52 and/or positioned within the food item. The cap 24 can be configured to be independently operable from the body 26 and/or may be operable upon direct connection with the body 26. By way of example, not limitation, the first temperature sensor 28 may be in wireless communication with the control unit 76, such that the first temperature sensor 28 is configured to send a first signal to the control unit 76 via the wireless communication interface 116.

The invention disclosed herein is further summarized in the following paragraphs and is further characterized by combinations of any and all of the various aspects described therein. According to one aspect of the present disclosure, a cooking appliance includes a housing that defines a cooking cavity. A rack is disposed within the cooking cavity. A probe assembly includes retention features that selectively couple the probe assembly to the rack. The probe assembly further incudes an outer case that includes a cap that is operably coupled with and selectively removable from a body of the outer case. The outer case also includes a first temperature sensor. A probe is disposed within the outer case and includes a second temperature sensor.

According to another aspect, a first temperature sensor is integrally formed with a cap and is operable when the cap is coupled to a body of an outer case.

According to another aspect, a first temperature sensor is operable when a cap is free from direct connection with a body.

According to another aspect, a cooking appliance further includes a controller that is communicatively coupled with a control unit of a probe assembly. The controller is configured to adjust a temperature of the cooking appliance in response to temperature data received from the control unit of the probe assembly.

According to another aspect, a probe assembly further includes a cable that extends from a body of an outer case, and a housing defines a connector port that is configured to receive the cable.

According to another aspect, a control unit disposed within a cap of an outer case and communicatively coupled with each of a first temperature sensor and a second temperature sensor.

According to another aspect, a control unit of a probe assembly is configured to receive a first signal from a first temperature sensor corresponding to an air temperature of a cooking cavity, and the control unit is configured to receive a second signal from a second temperature sensor corresponding to a food temperature.

According to another aspect of the present disclosure, a probe assembly for a cooking appliance includes an outer case that includes a cap, a body, and retention features that are coupled to each of the cap and the body. A first temperature sensor is operably coupled to the cap of the outer case. A probe is operably coupled to the body of the outer case and is selectively concealed by the cap. A second temperature sensor is operably coupled to the probe. A controller is communicatively coupled to each of the first temperature sensor and the second temperature sensor. The controller is configured to receive a first signal from the first temperature sensor when the cap is directly coupled to the body of the outer case.

According to another aspect, retention features of an outer case include a first retention feature and a second retention feature.

According to another aspect, a cap is coupled to a first rack via a first retention feature and a body is coupled to a second rack via a second retention feature.

According to another aspect, a second temperature sensor is operable when a cap is removed from a body.

According to another aspect, a probe assembly further includes a cable that is operably coupled to a body and is communicatively coupled with a controller.

According to another aspect, a controller is configured to receive a first temperature signal from the first temperature sensor and a second temperature signal from the second temperature sensor via a wireless communication interface According to another aspect, a controller is configured to provide power to a first temperature sensor at least when a cap of an outer case is coupled to a body.

According to yet another aspect of the present disclosure, a cooking appliance includes a housing that includes a user interface and defines a cooking cavity. A probe assembly is disposed within the cooking cavity. The probe assembly includes a body that includes a probe and a first retention feature. A cap includes a second retention feature and is removably coupled to the body. The cap includes a first temperature sensor and the probe of the body includes a second temperature sensor. A control unit is communicatively coupled to the first temperature sensor of the cap and the second temperature sensor of the probe. A controller is communicatively coupled to the user interface and is configured to display temperature data on the user interface.

According to another aspect, a controller is configured to adjust a temperature of a cooking cavity that is based on an air temperature detected by a first temperature sensor of a cap.

According to another aspect, a cooking appliance further includes a first rack that is disposed within a cooking cavity, and a second rack that is disposed within the cooking cavity proximate the first rack. A body of a probe assembly is coupled to the first rack via a first retention feature and a cap of a probe assembly is configured to the second rack via a second retention feature.

According to another aspect, a first retention feature and a second retention feature each include an attachment portion that has an angled edge and a retention portion that is proximate the attachment portion. The angled edge and the retention portion define a notch that is configured to receive a rack.

According to another aspect, a control unit is disposed within a cap and communicatively coupled with a controller.

According to another aspect, a probe assembly further includes a power indicator that is communicatively and operably coupled with a control unit and includes light emitting diodes, and a control unit is configured to activate and deactivate the light emitting diodes to indicate a charge of the probe assembly.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A cooking appliance, comprising:
a housing defining a cooking cavity;
a rack disposed within the cooking cavity; and
a probe assembly including retention features that selectively couple the probe assembly to the rack, the probe assembly further including:
an outer case including a cap, wherein the retention features directly couple the cap to the rack, and wherein the cap is operably coupled with and selectively removable from a body of the outer case, the outer case also including a first temperature sensor; and
a probe disposed within the outer case and including a second temperature sensor.

2. The cooking appliance of claim 1, wherein the first temperature sensor is integrally formed with the cap and is operable when the cap is coupled to the body of the outer case.

3. The cooking appliance of claim 2, wherein the first temperature sensor is operable when the cap is free from direct connection with the body.

4. The cooking appliance of claim 1, wherein the probe assembly further includes a cable extending from the body of the outer case, and wherein the housing defines a connector port configured to receive the cable.

5. The cooking appliance of claim 1, further comprising:
a control unit disposed within the cap of the outer case and communicatively coupled with each of the first temperature sensor and the second temperature sensor.

6. The cooking appliance of claim 1, wherein the control unit of the probe assembly is configured to receive a first signal from the first temperature sensor corresponding to an air temperature of the cooking cavity, and wherein the control unit is configured to receive a second signal from the second temperature sensor corresponding to a food temperature.

7. A probe assembly for a cooking appliance, the probe assembly comprising:
an outer case including a cap, a body, and retention features coupled to each of the cap and the body;
a first temperature sensor operably coupled to the cap of the outer case;
a probe operably coupled to the body of the outer case and selectively concealed by the cap;
a second temperature sensor operably coupled to the probe; and
a controller communicatively coupled to each of the first temperature sensor and the second temperature sensor, the controller being configured to receive a first signal from the first temperature sensor when the cap is directly coupled to the body of the outer case.

8. The probe assembly of claim 7, wherein the retention features of the outer case include a first retention feature and a second retention feature.

9. The probe assembly of claim 8, wherein the cap is coupled to a first rack via the first retention feature and the body is coupled to a second rack via the second retention feature.

10. The probe assembly of claim 7, wherein the second temperature sensor is operable when the cap is removed from the body.

11. The probe assembly of claim 7, further comprising:
a cable operably coupled to the body and communicatively coupled with the controller.

12. The probe assembly of claim 7, wherein the controller is configured to receive a first temperature signal from the first temperature sensor and a second temperature signal from the second temperature sensor via a wireless communication interface.

13. The probe assembly of claim 7, wherein the controller is configured to provide power to the first temperature sensor at least when the cap of the outer case is coupled to the body.

14. A cooking appliance, comprising:
a housing including a user interface and defining a cooking cavity;
a probe assembly disposed within the cooking cavity, the probe assembly including:
a body including a probe and a first retention feature;
a cap including a second retention feature and removably coupled to the body, the cap including a first temperature sensor and the probe of the body including a second temperature sensor; and
a control unit communicatively coupled to the first temperature sensor of the cap; and
a controller communicatively coupled to the user interface and the control unit of the probe assembly and configured to display temperature data on the user interface.

15. The cooking appliance of claim 14, wherein the controller is configured to adjust a temperature of the cooking cavity based on an air temperature detected by the first temperature sensor of the cap.

16. The cooking appliance of claim 14, further comprising:
a first rack disposed within the cooking cavity; and
a second rack disposed within the cooking cavity proximate the first rack, wherein the body of the probe assembly is coupled to the first rack via the first retention feature and the cap of the probe assembly is coupled to the second rack via the second retention feature.

17. The cooking appliance of claim 14, wherein the first retention feature and the second retention feature each include an attachment portion having an angled edge and a retention portion proximate the attachment portion, and wherein the angled edge and the retention portion define a notch configured to receive a rack.

18. The cooking appliance of claim 14, wherein the control unit is disposed within the cap and communicatively coupled with the controller.

19. The cooking appliance of claim 14, wherein the probe assembly further includes a power indicator communicatively and operably coupled with the control unit and including light emitting diodes, and wherein the control unit is configured to activate and deactivate the light emitting diodes to indicate a charge of the probe assembly.

20. The cooking appliance of claim 5, further comprising:
   a controller communicatively coupled with the control unit of the probe assembly, the controller being configured to adjust a temperature of said cooking appliance in response to temperature data received from the control unit of the probe assembly.

\* \* \* \* \*